US010733389B2

(12) United States Patent
Huang et al.

(10) Patent No.: US 10,733,389 B2
(45) Date of Patent: Aug. 4, 2020

(54) COMPUTER AIDED INPUT SEGMENTATION FOR MACHINE TRANSLATION

(71) Applicant: International Business Machines Corporation, Armonk, NY (US)

(72) Inventors: Fei Huang, Chatham, NJ (US); Jian-Ming Xu, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/122,301

(22) Filed: Sep. 5, 2018

(65) Prior Publication Data

US 2020/0073945 A1 Mar. 5, 2020

(51) Int. Cl.
*G06F 40/58* (2020.01)
*G06F 9/451* (2018.01)

(52) U.S. Cl.
CPC .............. *G06F 40/58* (2020.01); *G06F 9/453* (2018.02)

(58) Field of Classification Search
USPC ..................................................... 704/1–504
See application file for complete search history.

(56) References Cited

U.S. PATENT DOCUMENTS

| | | | | | |
|---|---|---|---|---|---|
| 4,894,779 | A | * | 1/1990 | Suzuki | G06F 40/47 704/2 |
| 5,111,398 | A | * | 5/1992 | Nunberg | G06F 40/253 704/9 |
| 5,384,893 | A | * | 1/1995 | Hutchins | G10L 13/08 704/258 |
| 5,535,120 | A | * | 7/1996 | Chong | G06F 40/55 704/3 |
| 5,758,072 | A | * | 5/1998 | Filepp | C08L 67/025 707/E17.032 |
| 6,199,100 | B1 | * | 3/2001 | Filepp | C08L 67/025 707/E17.032 |
| 6,275,852 | B1 | * | 8/2001 | Filepp | C08L 67/025 707/E17.032 |
| 6,341,372 | B1 | * | 1/2002 | Datig | G06N 3/004 715/234 |
| 7,295,963 | B2 | * | 11/2007 | Richardson | G06F 40/47 704/2 |
| 7,813,916 | B2 | * | 10/2010 | Bean | G06F 40/289 704/9 |
| 7,912,705 | B2 | * | 3/2011 | Wasson | G06F 16/313 704/9 |

(Continued)

Primary Examiner — Marcus T Riley
(74) Attorney, Agent, or Firm — Cantor Colburn LLP; Anthony Curro

(57) ABSTRACT

A computer-implemented method for leveraging computer aided input segmentations is provided. The computer aided input segmentations identify divisions in a source text. The division are utilized to translate the source text from a first language to a second language. In this regard, segmentation boundaries are designated within the source text based on the computer aided input segmentations, which determine the divisions. Each division is automatically translated into the second language to generate translated segments corresponding to the division. These translated segments are combined to generate a translated text.

17 Claims, 4 Drawing Sheets

(56) References Cited

U.S. PATENT DOCUMENTS

| | | | |
|---|---|---|---|
| 8,265,925 B2* | 9/2012 | Aarskog | G06F 40/30 704/9 |
| 8,478,581 B2* | 7/2013 | Chen | G06F 40/253 704/9 |
| 8,635,059 B2 | 1/2014 | Estelle et al. | |
| 8,935,148 B2 | 1/2015 | Christ | |
| 9,002,700 B2* | 4/2015 | Hoover | G06F 40/289 704/9 |
| 9,152,623 B2* | 10/2015 | Wroczy ski | G06F 40/211 |
| 10,395,772 B1* | 8/2019 | Lucas | G06K 9/64 |
| 2002/0198697 A1* | 12/2002 | Datig | G06N 3/004 704/1 |
| 2003/0167307 A1* | 9/2003 | Filepp | C08L 67/025 709/205 |
| 2005/0021322 A1* | 1/2005 | Richardson | G06F 40/47 704/2 |
| 2009/0326919 A1* | 12/2009 | Bean | G06F 40/289 704/9 |
| 2011/0184718 A1* | 7/2011 | Chen | G06F 40/253 704/2 |
| 2011/0313757 A1* | 12/2011 | Hoover | G06F 40/211 704/9 |
| 2013/0262076 A1* | 10/2013 | Kamatani | G06F 40/51 704/2 |
| 2014/0136188 A1* | 5/2014 | Wroczynski | G06F 40/211 704/9 |
| 2014/0358519 A1 | 12/2014 | Mirkin et al. | |
| 2015/0127373 A1 | 5/2015 | Li et al. | |
| 2015/0154174 A1* | 6/2015 | Hoover | G06F 40/253 704/9 |
| 2015/0309983 A1* | 10/2015 | Hoover | G06F 40/205 704/9 |
| 2016/0062982 A1* | 3/2016 | Wroczynski | G06F 40/205 704/9 |
| 2019/0272323 A1* | 9/2019 | Galitsky | G06F 40/253 |
| 2020/0073945 A1* | 3/2020 | Huang | G06F 9/453 |

* cited by examiner

COMPUTER AIDED INPUT SEGMENTATION FOR MACHINE TRANSLATION

BACKGROUND

The present invention relates in general to machine translations. More specifically, the present invention relates to computer aided input segmentation for machine translation.

Natural language processing (NLP) is a field of computer science, artificial intelligence, and computational linguistics concerned with the interactions between computers and humans using languages (i.e., natural languages). As such, NLP is related to the area of human-computer interaction. Among the challenges in implementing NLP systems is enabling computers to derive meaning from NL inputs, as well as the effective and efficient generation of NL outputs. Included among NLP systems are machine translation systems.

In general, machine translation quality declines as a length of an input text increases, which includes cases where an input text is a single sentence with a complicated composite structure or is a paragraph (with possibly incorrect punctuation) consisting of multiple sentences. This is particularly troublesome for conventional machine translation graphic user interfaces (GUIs). For instance, while a conventional machine translation GUI translates an input text in an input box, it does not allow a user to select part of the input text for translation, divide the input text into different segments, or specify a particular translation order of the input text. Users, in turn, manually divide the input text into a main clause, subordinate clauses, and/or phrases and then separately enter these clauses into the input for individual translation to maintain quality.

SUMMARY

According to one or more embodiments of the invention, a computer-implemented method for leveraging computer aided input segmentations is provided. The computer aided input segmentations identify divisions in a source text. The division are utilized to translate the source text from a first language to a second language. In this regard, segmentation boundaries are designated within the source text based on the computer aided input segmentations, which determine the divisions. Each division is automatically interpreted into the second language to generate translated segments corresponding to the division. These translated segments are combined to generate a translated text.

According to embodiments of the invention, the computer-implemented method described herein can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
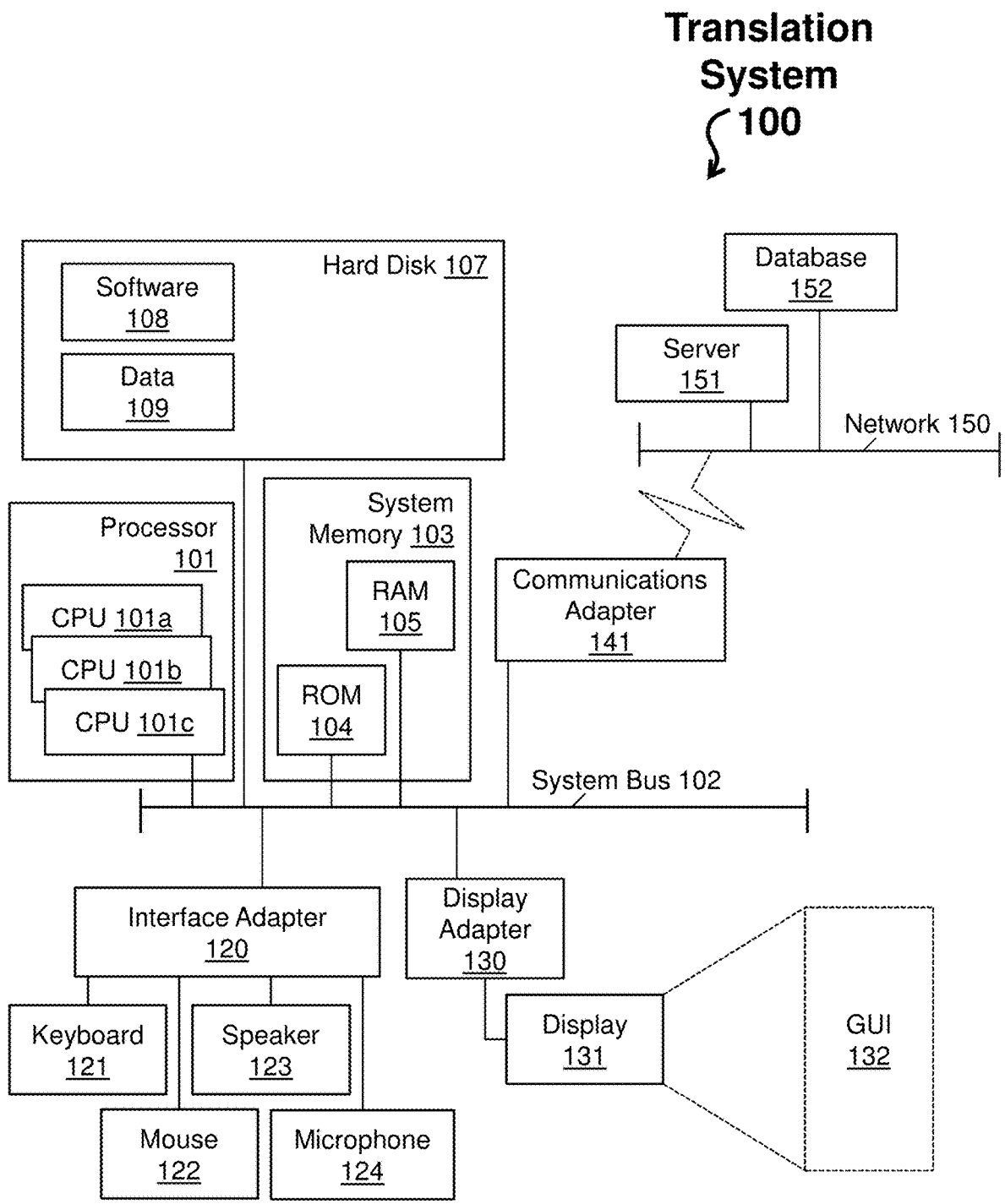
FIG. 1 depicts a system according to one or more embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, conventional machine translation GUIs utilize computational linguistic software to translate input text from one language to another by simple substitution of words (i.e., translation by matching and converting text in one language to equivalent text in another language, usually using a table). Yet, the computational linguistic software has an inherent inability to expand beyond this simple substitution, thus it struggles to recognize whole phrases (e.g., a main clause, subordinate clauses, and phrases), idioms, slangs, pauses, and the like, which further results in a failure to achieve a perfect translation of the input text. In turn, and as discussed herein, machine translation quality by conventional machine translation GUIs declines as a length (number of words) and complexity (number of clauses/phrases) of the input text increases.

Turning now to an overview of the aspects of the invention, one or more embodiments of the invention address the herein-described shortcomings of the conventional machine translation GUIs by executing translation/transliteration linguistic software that utilizes divisions in the input text to recognize and translate whole phrases, idioms, slangs, pauses, and the like.

The herein-described aspects of the invention address the shortcomings of the conventional machine translation GUIs by leveraging computer aided input segmentations (whether automatic or user driven) that identify the divisions in the input text. The computer aided input segmentations are or performed on the entire text in the input box of a translation GUIs of the present invention. These divisions are processed by the translation/transliteration linguistic software to achieve a perfect translation of the input text.

Embodiments of the invention disclosed herein may include system, method, and/or computer program product (herein a translation system) that executing translation/transliteration linguistic software to achieve the perfect translation of the input text.

Turning now to FIG. 1, a translation system 100 for implementing the teachings herein is shown in according to one or more embodiments of the invention. In this embodiment, the translation system 100 has a processor 101, which can include one or more central processing units (CPUs) 101a, 101b, 101c, etc. The processor 101, also referred to as a processing circuit, microprocessor, computing unit, is coupled via a system bus 102 to a system memory 103 and various other components. The system memory 103 includes read only memory (ROM) 104 and random access memory (RAM) 105. The ROM 104 is coupled to the system bus 102 and may include a basic input/output system (BIOS), which controls certain basic functions of the translation system 100. The RAM is read-write memory coupled to the system bus 102 for use by the processor 101.

The translation system 100 of FIG. 1 includes a hard disk 107, which is an example of a tangible storage medium readable executable by the processor 101. The hard disk 107 stores software 108 and data 109. The software 108 is stored as instructions for execution on the translation system 100 by the processor 101 (to perform process, such as the process flows of FIGS. 3-4). In accordance with one or more embodiments, the software 108 is an example of the translation/transliteration linguistic software described herein. The data 109 includes a set of values of qualitative or quantitative variables organized in various data structures to support and be use by operations of the software 108.

The translation system 100 of FIG. 1 includes one or more adapters (e.g., hard disk controllers, network adapters, graphics adapters, etc.) that interconnect and support communications between the processor 101, the system memory 103, the hard disk 107, and other components of the translation system 100 (e.g., peripheral and external devices). In one or more embodiments of the present invention, the one or more adapters can be connected to one or more I/O buses that are connected to the system bus 102 via an intermediate bus bridge, and the one or more I/O buses can utilize common protocols, such as the peripheral component interconnect (PCI).

As shown, the translation system 100 includes an interface adapter 120 interconnecting a keyboard 121, a mouse 123, a speaker 123, and a microphone 124 to the system bus 102. The translation system 100 includes a display adapter 130 interconnecting the system bus 102 to a display 131. The display adapter 130 (and/or the processor 101) can include a graphics controller to provide graphics performance, such as a display and management of a GUI 132. The GUI 132 is composite interface space where interactions between users and the translation system 100 occur to enable effective operation and control of the software 108 (e.g., translation/transliteration linguistic software). The GUI 132 can comprise tactile, visual, and/or audio components to provide a multimedia user experience. A communications adapter 141 interconnects the system bus 102 with a network 150 enabling the translation system 100 to communicate with other systems, devices, data, and software, such as a server 151 and a database 151. In one or more embodiments of the present invention, the operations of the software 108 and the data 109 can be implemented on the network 150 by the server 151 and the database 151. For instance, the network 150, the server 151, and the database 151 can combine to provide internal iterations of the software 108 and the data 109 as a platform as a service, a software as a service, and/or infrastructure as a service (e.g., as a web application in a distributed system).

Thus, as configured in FIG. 1, the operations of the software 108 and the data 109 (e.g., the translation system 100) are necessarily rooted in the computational ability of the processor 101 and/or the server 151 to overcome and address the herein-described shortcomings of the conventional machine translation GUIs. In this regard, the software 108 and the data 109 improve computational operations of the processor 101 and/or the server 151 of the translation system 100 by reducing errors in translations by matching and converting text that cause additional processing cycles (thereby increasing efficiency of the translation system 100).

Figure 2:
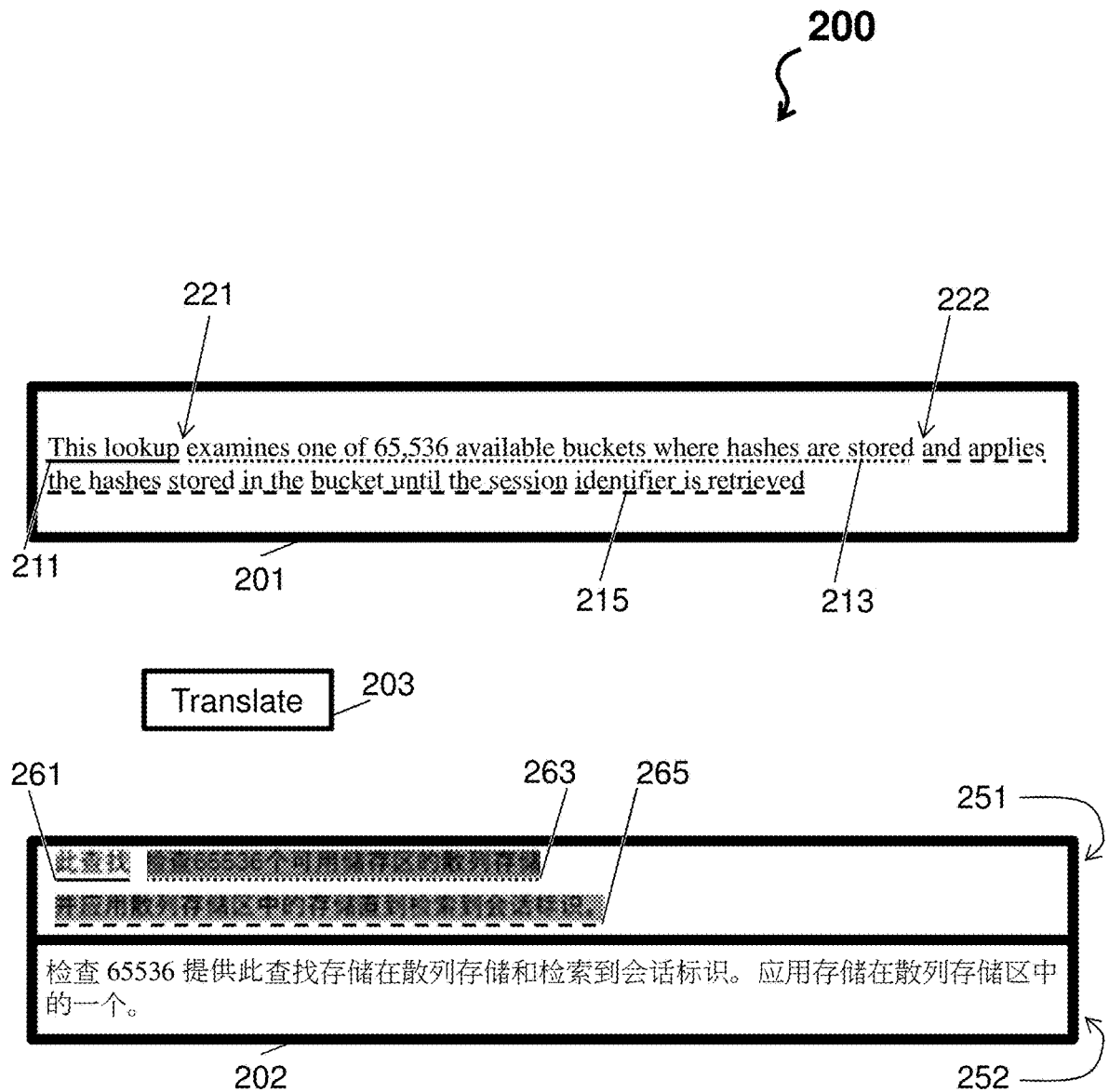
FIG. 2 depicts a GUI in accordance with one or more embodiments of the invention.

FIG. 2 depicts a GUI 200 in accordance with one or more embodiments of the invention. In accordance with one or more embodiments of the invention, the GUI 200 is an example of the GUI 132 generated, displayed, and managed by the translation system 100. As shown, the GUI 200 includes an input window 201, an output window 202, and an optional translate button 203. The GUI 200 enables a user to enter an input or source text to the input window 201. Once entered, the user can manually or the software 108 can automatically segment the source text through computer aided input segmentations. In this regard, the computer aided input segmentations comprise user inputs dividing the source text according to a main clause and one or more subordinate clauses and/or comprise automatic phrase identifications by the processor dividing the source text according to a main clause and one or more subordinate clauses. Note that user inputs can be a manual interaction by a user with the GUI 200.

Based on and in response to receiving the computer aided input segmentations, the source text is segmented into divisions 211, 213, and 215 by establishing segmentation boundaries 221 and 222. Note that the divisions 211, 213, and 215 can be emphasized by demarcations or section designations within the input window 201 for visual identification. As shown, distinct underline styles are utilized as section designations; however, other visual indication can be used, such as multicolor highlights.

In accordance with one or more embodiments of the invention, for example, a user provides a segmentation by first clicking (e.g., right clicking) with a mouse courser in the input window 201 at a position where the user desires to segment the source text (such as after the word "lookup"). A drop down menu can then appear with a menu item indicating "insert boundary." The user then selects the "insert boundary" menu item, thereby providing a computer aided input segmentation. In response to receiving the segmentation, the segmentation boundary 221 is generated at the location of the click.

In accordance with one or more embodiments of the invention, for example, the software 108 provides a computer aided input segmentation by automatically detecting clauses, phrases, and idioms of the source text based on punctuations, conjunctions, and natural language pauses. For instance, the software 108 automatically detects the conjunction "and" within the source text as a computer aided input segmentation. The software 108 uses this computer aided input segmentation to generate the segmentation boundary 222.

The software 108 can automatically translate the source text according to the segmentation boundaries 221 and 222.

Further, the optional translate button 203 can be directly selected by a user to the same. As further described herein, the optional translate button 203 can also be used when input modifications are received with respect to the source text and the segmentation boundaries 221 and 222.

In accordance with one or more embodiments of the invention, from the drop down menu generated by a user directed click (e.g., any type of mouse click), a user can adjust, add, and/or delete the segmentation boundaries 221 and 222, can cause only a selected division to be translated to the output window 202, and can control order of division translations (to enable a natural and fluent translation and transliteration).

The GUI 200 enables a user to view the translation of source text to the output window 202. The output window 202 can includes a first sub-window 251 and a second sub-window 252. The first sub-window can provide translated segments 261, 263, and 265. Note that the translated segments 261, 263, and 265 can be emphasized by demarcations or section designations within the output window 202 for visual identification. As shown, the distinct underline styles used in the input window 201 are utilized as section designations for the translated segments 261, 263, and 265. The second sub-window 252 can show the fully translated text.

Figure 3:
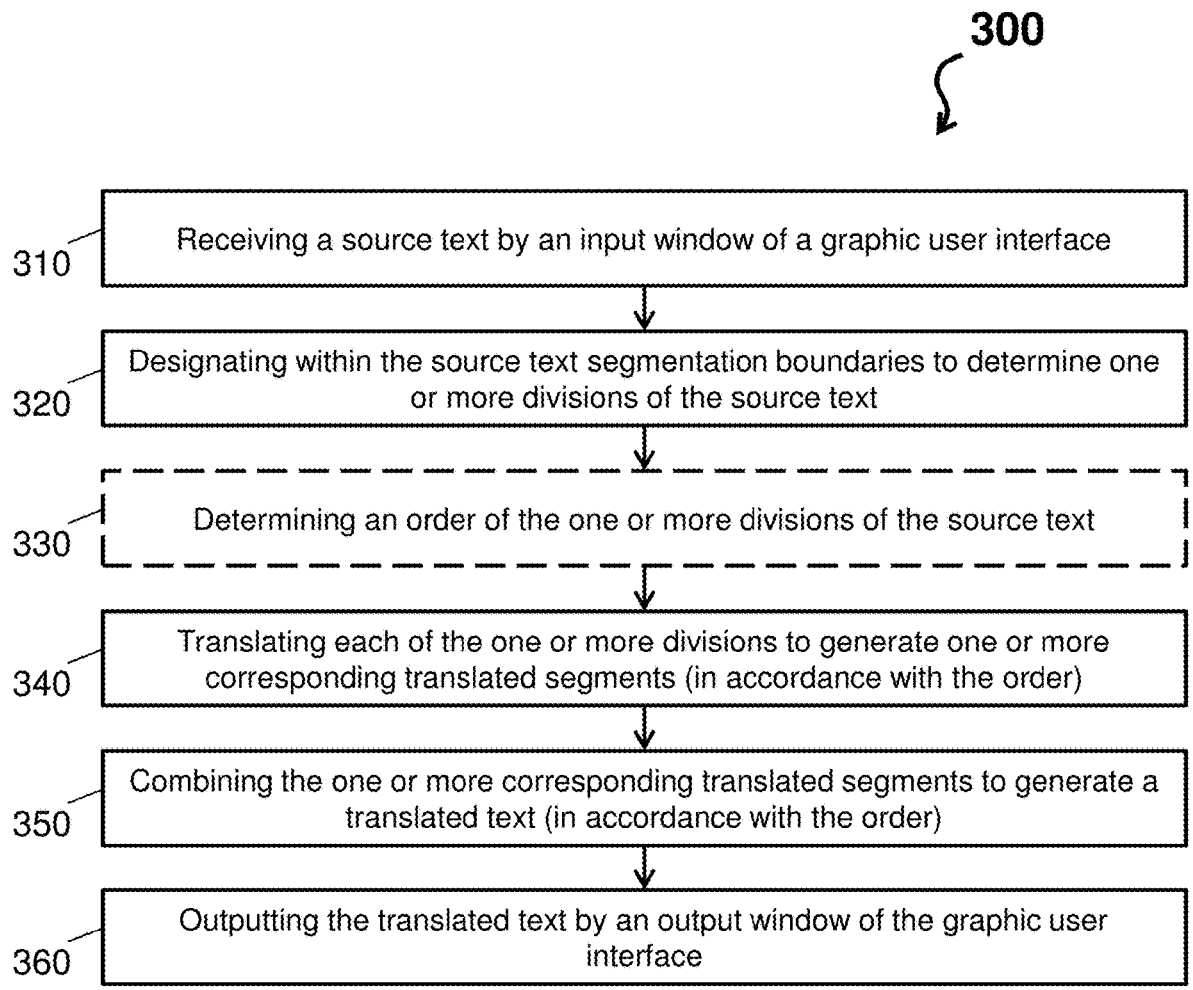
FIG. 3 depicts a process flow in accordance with one or more embodiments of the invention.

FIG. 3 depicts a process flow 300 in accordance with one or more embodiments of the invention. The process flow 300 is an example of the translation system 100 leveraging computer aided input segmentations that identify one or more divisions 211, 213, and 215 in the source text to translate the source text from a first language to one or more second languages. The process flow 300 can be executed/implemented by the translation system 100 and/or components therein (such as the processor 101).

The process flow 300 beings at block 310, where the translation system 100 receives the source text via the input window 201 (e.g., an input interface) of the GUI 200. At block 320, the translation system 100 designates within the source text segmentation boundaries 221 and 222 based on the computer aided input segmentations (as described herein) to determine the one or more divisions 211, 213, and 215. In accordance with one or more embodiments, when the source text is received, at least a first segmentation is provided automatically by the translation system 100 and can later be modified by the user. At dashed-block 330, the translation system 100 determines an order of the one or more divisions 211, 213, and 215 of the source text. The operation of the dashed-block 330 is optional.

At block 340, the translation system 100 automatically translates each of the one or more divisions 211, 213, and 215 into the one or more second languages to generate one or more corresponding translated segments 261, 263, and 265. At block 350, the translation system 100 combines the one or more corresponding translated segments 261, 263, and 265 to generate a translated text. Note that translating and combining in accordance with the order each of the one or more divisions to generate the translated text is optional and based on whether the operation of dashed-block 330 is performed.

At block 360, the translation system 100 outputs the translated text via the output window 202 (e.g., an output interface).

Figure 4:
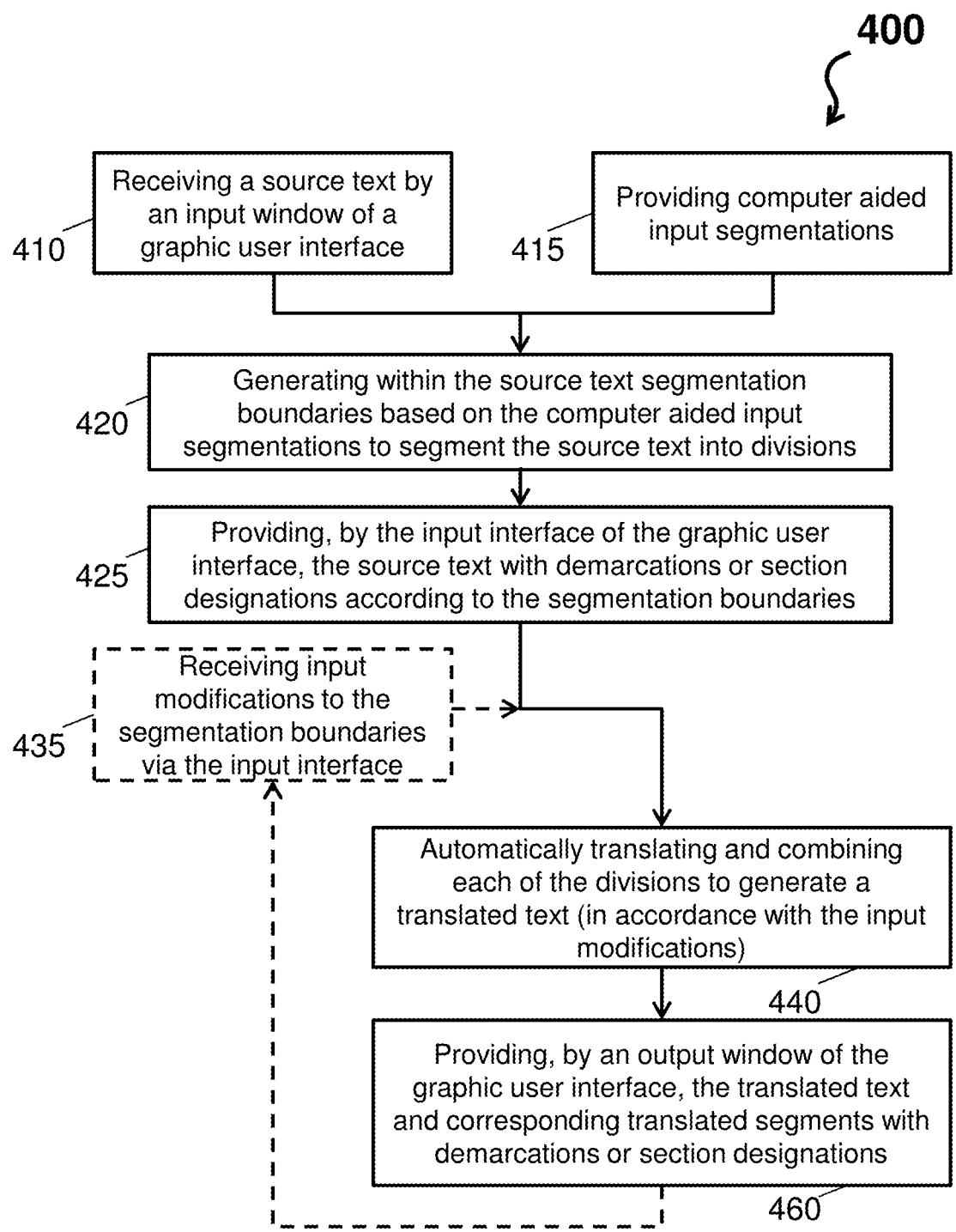
FIG. 4 depicts a process flow in accordance with one or more embodiments of the invention.

FIG. 4 depicts a process flow 400 in accordance with one or more embodiments of the invention. The process flow 400 is an example of the translation system 100 leveraging computer aided input segmentations that identify one or more divisions 211, 213, and 215 in the source text to translate the source text from a first language to one or more second languages.

The process flow 400 beings at block 410, where the translation system 100 receives a source text by the input window 201 (e.g., an input interface) of the GUI 200. At block 415, computer aided input segmentations are provided. The computer aided input segmentations comprise user inputs dividing the source text according to a main clause and one or more subordinate clauses and/or comprise automatic phrase identifications by the processor 101 based on dividing the source text according to a main clause and one or more subordinate clauses.

At block 420, the translation system 100 generates within the source text segmentation boundaries 221 and 222 based on the computer aided input segmentations to segment the source text into divisions 211, 213, and 215. In accordance with one or more embodiments, when the source text is received, at least a first segmentation is provided automatically by the translation system 100 and can later be modified by the user. At block 425, the input window 201 provides the source text with demarcations or section designations according to the segmentation boundaries 221 and 222.

At dashed-block 435, the translation system 100 receives input modifications to the segmentation boundaries 221 and 222 via the input window 201. The input modifications comprise user inputs adding, adjusting, and/or deleting the segmentation boundaries 221 and 222 that identify the main clause and the one or more subordinate clauses. The operation of the dashed-block 435 is optional.

At block 440, the translation system 100 automatically translates and combines each of the divisions 211, 213, and 215 to generate a translated text and corresponding translated segments 261, 263, and 265 with demarcations or section designations (in accordance with the input modifications). Note that the optional translate button 203 can be used to trigger/cause the automatically translation and combination of the divisions 211, 213, and 215.

At block 460, the translation system 100 outputs the translated text via the output window 202 (e.g., an output interface). The corresponding translated segments 261, 263, and 265 can be provided in the first sub-window 251, while the completed clean version of the translated text can be provided in the second sub-window 252. Note that the segmentation boundaries 221 and 222 can carried into the translated text and the output window 202, where they are further modifiable.

Note that after block 460, the translation system 100 can again receive input modifications to the segmentation boundaries 221 and 222 via the input window 201 (as shown by dashed-block 435). Then the process flow 400 returns to block 440 and 460 regenerate the translation according to the modified segmentation boundaries 221 and 222. Note that the optional translate button 203 can be used to trigger/cause the translation regeneration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for leveraging computer aided input segmentations that identify one or more divisions in a source text to translate the source text from a first language to one or more second languages, the computer-implemented method comprising:
designating, by a processor coupled to a memory, within source text segmentation boundaries based on the computer aided input segmentations to determine the one or more divisions;
determining an order of the one or more divisions of the source text;
automatically translating, by the processor, each of the one or more divisions in accordance with the order into the one or more second languages to generate one or more corresponding translated segments;
combining, by the processor, the one or more corresponding translated segments in accordance with the order to generate a translated text; and
receiving, subsequent to the translated text being generated, one or more input modifications altering the source text segmentation boundaries that cause the translated text to be regenerated according one or more altered divisions, the order, and subsequent to the translated text being generated.

2. The computer-implemented method of claim 1, wherein the computer aided input segmentations comprise user inputs dividing the source text according to a main clause and one or more subordinate clauses.

3. The computer-implemented method of claim 1, wherein the computer aided input segmentations comprise automatic phrase identifications by the processor dividing the source text according to a main clause and one or more subordinate clauses.

4. The computer-implemented method of claim 1 further comprising receiving the source text via an input interface of a graphic user interface and providing demarcations or section designations within the input interface on the source text to visually identify the one or more divisions.

5. The computer-implemented method of claim 1 further comprising outputting the translated text via an output interface of a graphic user interface and providing demarcations or section designations within the output interface on the translated text to visually identify the one or more corresponding translated segments.

6. A computer program product comprising a computer readable storage medium having program instructions for leveraging computer aided input segmentations that identify one or more divisions in a source text to translate the source text from a first language to one or more second languages, the program instructions executable by a processor coupled to a memory to cause the processor to perform:
designating within source text segmentation boundaries based on the computer aided input segmentations to determine the one or more divisions determining an order of the one or more divisions of the source text;
automatically translating each of the one or more divisions in accordance with the order into the one or more second languages to generate one or more corresponding translated segments;
combining the one or more corresponding translated segments in accordance with the order to generate a translated text; and
receiving, subsequent to the translated text being generated, one or more input modifications altering the source text segmentation boundaries that cause the translated text to be regenerated according one or more altered divisions, the order, and subsequent to the translated text being generated.

7. The computer program product of claim 6, wherein the computer aided input segmentations comprise user inputs dividing the source text according to a main clause and one or more subordinate clauses.

8. The computer program product of claim 6, wherein the computer aided input segmentations comprise automatic phrase identifications by the processor dividing the source text according to a main clause and one or more subordinate clauses.

9. The computer program product of claim 6, the program instructions further executable to cause:
receiving the source text via an input interface of a graphic user interface and providing demarcations or section designations within the input interface on the source text to visually identify the one or more divisions.

10. The computer program product of claim 6, the program instructions further executable to cause:
outputting the translated text via an output interface of a graphic user interface and providing demarcations or section designations within the output interface on the translated text to visually identify the one or more corresponding translated segments.

11. A translation system comprising a processor and a memory storing program instructions for leveraging computer aided input segmentations that identify one or more divisions in a source text to translate the source text from a first language to one or more second languages, the program instructions executable by the processor to cause the system to perform:
designating within source text segmentation boundaries based on the computer aided input segmentations to determine the one or more divisions
determining an order of the one or more divisions of the source text;
automatically translating each of the one or more divisions in accordance with the order into the one or more second languages to generate one or more corresponding translated segments;
combining the one or more corresponding translated segments in accordance with the order to generate a translated text; and
receiving, subsequent to the translated text being generated, one or more input modifications altering the source text segmentation boundaries that cause the translated text to be regenerated according one or more altered divisions, the order, and subsequent to the translated text being generated.

12. The translation system of claim 11, wherein the computer aided input segmentations comprise user inputs dividing the source text according to a main clause and one or more subordinate clauses.

13. The translation system of claim 11, wherein the computer aided input segmentations comprise automatic phrase identifications by the processor dividing the source text according to a main clause and one or more subordinate clauses.

14. The translation system of claim 11, the program instructions further executable to cause:
   receiving the source text via an input interface of a graphic user interface and providing demarcations or section designations within the input interface on the source text to visually identify the one or more divisions.

15. The translation system of claim 11, the program instructions further executable to cause:
   outputting the translated text via an output interface of the graphic user interface and providing demarcations or section designations within the output interface on the translated text to visually identify the one or more corresponding translated segments.

16. The computer-implemented method of claim 1, wherein the one or more input modifications comprise user inputs adding, adjusting, or deleting the segmentation boundaries that identify a main clause and one or more subordinate clauses.

17. The computer-implemented method of claim 1, wherein a user directed input controls the order of the one or more divisions to enable a natural and fluent translation and transliteration.

* * * * *